US006763763B2

(12) United States Patent
Honeck et al.

(10) Patent No.: US 6,763,763 B2
(45) Date of Patent: Jul. 20, 2004

(54) WEB PRESS ROTARY EQUIPMENT PROTECTION SYSTEM

(75) Inventors: Gregory A. Honeck, Richfield, WI (US); Craig W. Smith, Indianapolis, IN (US)

(73) Assignee: Discover Graphics, Inc., Richfield, WI (US)

( * ) Notice: Subject to any disclaimer, the term of this patent is extended or adjusted under 35 U.S.C. 154(b) by 0 days.

(21) Appl. No.: 10/299,262

(22) Filed: Nov. 19, 2002

(65) Prior Publication Data

US 2003/0106450 A1 Jun. 12, 2003

Related U.S. Application Data

(60) Provisional application No. 60/331,836, filed on Nov. 20, 2001.

(51) Int. Cl.[7] .................... B41F 13/56; G03B 1/56

(52) U.S. Cl. .................... 101/480; 101/226; 101/228; 226/91; 242/71.8; 242/74.1

(58) Field of Search .................... 101/226, 480, 101/228, 484; 242/71.8, 74.1; 226/91

(56) References Cited

U.S. PATENT DOCUMENTS 4,629,136 A * 12/1986 Vallance .................... 242/71.8
4,974,788 A * 12/1990 Covington .................... 242/74.1
5,372,290 A * 12/1994 Marmin .................... 226/91
5,398,610 A 3/1995 Pavliny et al. .................... 101/484
5,443,008 A 8/1995 Pavliny et al. .................... 101/484
5,652,388 A 7/1997 Callan et al. .................... 73/628
5,678,484 A * 10/1997 Callan et al. .................... 101/226
6,298,782 B1 10/2001 Gregory et al. .................... 101/484

* cited by examiner

*Primary Examiner*—Andrew H. Hirshfeld
*Assistant Examiner*—Marvin P. Crenshaw
(74) *Attorney, Agent, or Firm*—Whyte Hirschboeck Dudek SC

(57) ABSTRACT

A web press rotary equipment protection device is disclosed. The device includes a roller that is slotted to receive a media used as part of a rotary process. The device remains in a stationary position, allowing the media to pass through the slot of the roller, until a break in the medium occurs. Upon such an occurrence, the roller rotates, thereby engaging the media and allowing the media to wrap around the roller rather than being drawn back into the rotary device of the rotary process. The device is useful in any rotary-type process, such as printing, converting plastic and textile industries where it is desirable to have a medium to be wrapped rather than be withdrawn back into the source of the media roll or dispensed directly onto a floor after a medium break. The device is useful to prevent damage to rotary systems resulting from the media being pulled back into the rotary system.

14 Claims, 6 Drawing Sheets

WEB PRESS ROTARY EQUIPMENT PROTECTION SYSTEM

CROSS-REFERENCE TO RELATED APPLICATION

The present application claims the benefit of U.S. Provisional Application No. 60/331,836 filed Nov. 20, 2001, which is incorporated herein by reference.

BACKGROUND OF THE INVENTION

The present invention relates generally to protection devices for web press rotary equipment. More specifically, the present invention relates to a system and methodology for preventing wrap ups and damage to web press rotary equipment as a result of web breaks in the medium used in web printing or other rotary press.

In industrial process applications, particularly in automatic processes on web printing presses, maintaining continuity of the web is critical to proper operation of the web press rotary equipment. It is common for various web materials or medium (e.g., paper, textile, plastic, etc.) to be unwound and fed through a rotary process as part of an industrial operation (e.g., printing press, die cutter, perforating unit, gluing unit, coating unit, etc.). In some applications, a web printing press will utilize a rotary printing press that uses a continuous roll of paper that travels through the press.

In many of these industrial applications, the medium can tend to break when exiting from the rotary application due to, for example, a defect in the medium itself, or fatigue in the medium which may be caused by the industrial process. As press speeds increase, the need to protect the print unit from a potentially damaging web break also increases.

Breaks in the web medium can result from bad paper splices (splices are used when one roll is depleted and a new roll is started). Also, ineffective joints formed between the old paper rolls and new paper rolls, defective paper, and slime hole defects (a natural defect in the paper during the paper making process which leaves a hole in the paper which weakens the paper as it goes through the press) all contribute to breakage in the web medium.

Referring to FIG. 1, a schematic illustration of a web break is shown in a prior art rotary process without use of a web press rotary equipment protection device. In this figure, after a web medium 1 passes through a rotary process 2, and enters a dryer device 3, a web break 4 occurs. Therefore the continuity in the web medium 1 is disrupted.

As a result of the medium breaking after the rotary process, the medium will be pulled back into the last cylinders from which the web medium exited following the rotary process. This "pull back" causes "wrap ups" of the medium onto the rotary cylinders within the rotary process equipment. The result of wrap ups may include, among other things, damage to the rotary cylinder and cylinder journals. Additionally, other damage can be caused by the medium continuing to build up on the cylinders until the process is stopped by an operator or detection device. Further, damage that is caused to the rotary printing unit from a web wrap up after a web break can create the following problems for the printer: excessive down time caused by attempts to remove the paper from the cylinder; damage to rubber blankets associated with the printing apparatus; cylinder slippage resulting from printing cylinders that go out of time synchronization in relationship to other cylinders in the unit; and finally, bending of the printing cylinder journals. The removal and repair of cylinders increases down-time, labor costs, part costs and lost production.

FIG. 2 shows a schematic illustration of a resulting wrap up from the web break of FIG. 1. Web medium 1 following a break is shown wrapping up around a cylinder 5 of rotary process 2. The wrap up occurs because of the continued rotation of cylinder 5 in a direction indicated by arrow 6 even after the web medium 1 has been broken.

Also, a web press printing system will often include, in addition to one or more rotary printing operations, a final drying operation that dries the paper or other web medium that is fed through the web press. Web breaks that occur in or around the dryer can result in similar problems caused by the post-break medium entering the drying area.

In general, prior solutions included rollers that were constantly in motion that pushed the web onto a roller when a web break was detected.

In the past, high-speed web (paper) detection systems have been used to detect web breaks. These systems would monitor the status of the paper going through the press and determining if the paper was in tact or if it had broken. As a result of the web break being detected, the web detection system would send a signal to shut down the press and also to activate a severing device to cut the paper in a strategic location. These systems had limited success to catch each web break in time, particularly as press speeds increased.

Other systems, upon a break in the web, pulled paper out of the rotary application by two pinch rollers that would push the paper onto the floor causing clutter, and potentially unsafe conditions.

Therefore, it would be desirable to be able to, following a break in the web medium, prevent the web medium from being pulled back into a rotary process, and prevent "wrap ups" of the web medium onto the cylinders and journals used in the web process. Also, it would be desirable to retrieve the broken web medium from a dryer unit in the printing process.

SUMMARY OF THE INVENTION

Disclosed herein is a protection device for web press rotary equipment. In one aspect of the invention, a web press rotary equipment protection device for use with a rotary system and a web medium is disclosed, the device comprising: a roller having a web medium passage slot, the roller capable of receiving the web medium through the medium passage slot; wherein upon a break in the web medium, the roller rotates and engages the web medium in the medium passage slot such that the web medium wraps around the roller, thereby preventing the web medium from being pulled back into the rotary system.

In another aspect, a method of protecting a rotary web press disclosed, the method comprising: providing a roller having a web medium passage slot for receiving a web medium therethrough from the rotary web press; passing the web medium through the web medium passage slot of the roller.

Various other features, objects and advantages of the present invention will be made apparent from the following detailed description and the drawings.

BRIEF DESCRIPTION OF THE DRAWINGS

The drawings illustrate several embodiments presently contemplated for carrying out the invention.

In the drawings.

DETAILED DESCRIPTION OF THE PREFERRED EMBODIMENT

Figure 1:
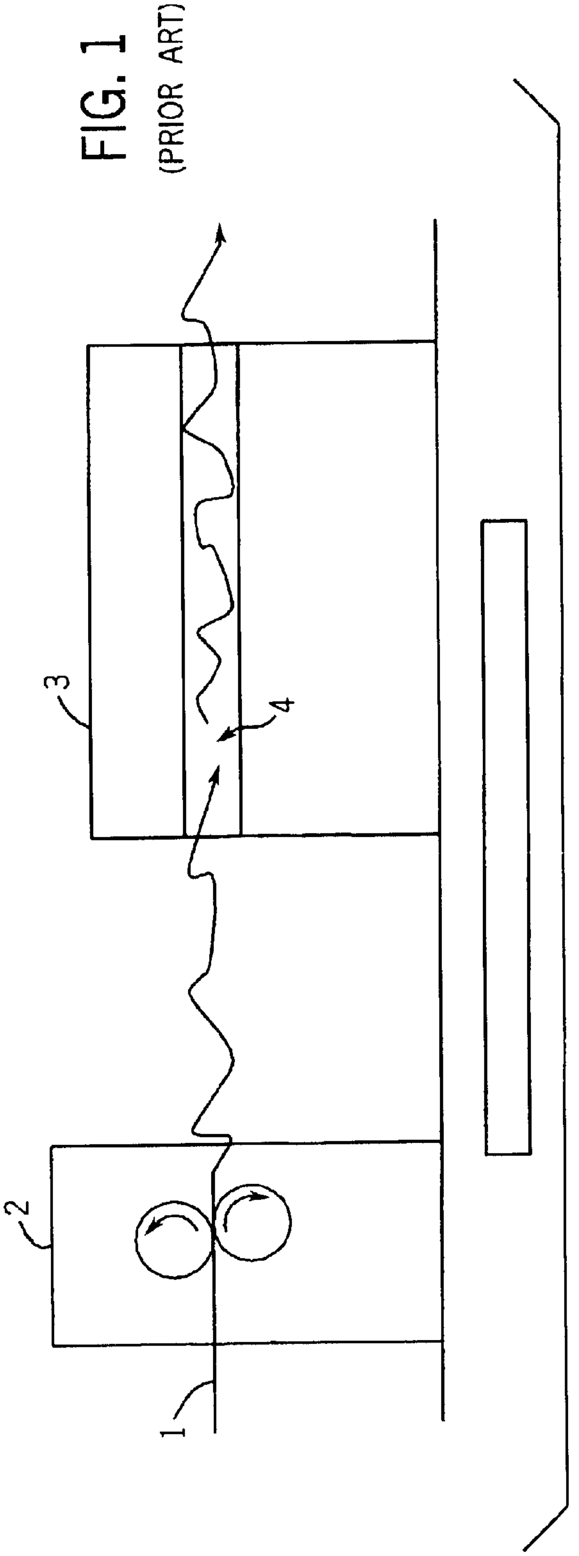
FIG. 1 (PRIOR ART)
FIG. 1 is a schematic illustration of a web break in a prior art rotary process without use of a web press rotary equipment protection device.
Figure 2:
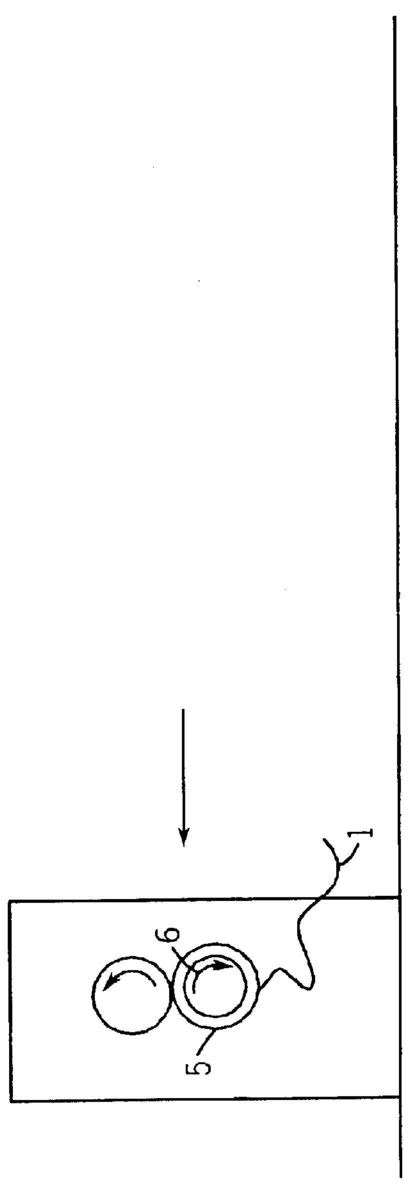
FIG. 2 (PRIOR ART)
FIG. 2 is a schematic illustration showing a resulting wrap up from the web break of FIG. 1.
Figure 3:
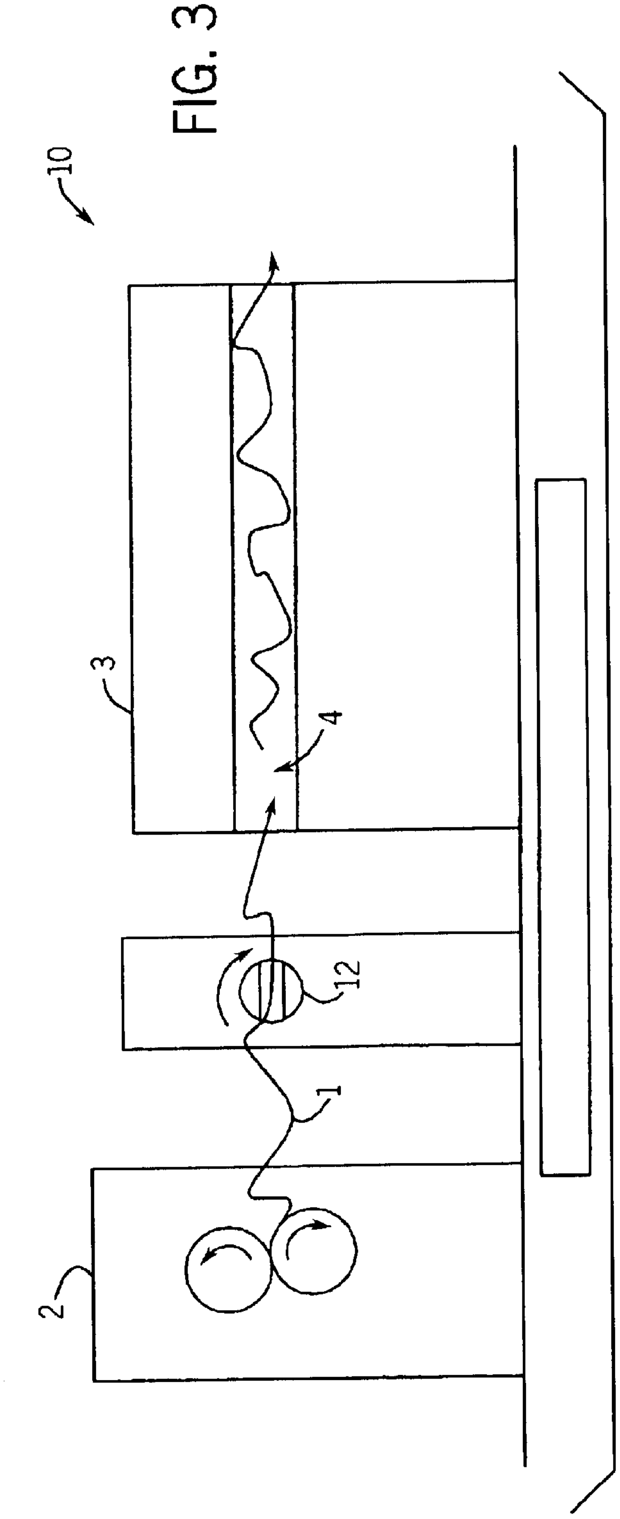
FIG. 3 is a schematic illustration of a web break in a rotary process using the web press rotary equipment protection device according to one aspect of the present invention.

Referring to FIG. 3, a schematic illustration of a web break in a rotary process using the web press rotary equipment protection device, generally identified by the numeral 10, is shown. The device 10 is positioned between the rotary application, such as a printing press 2, and dryer device 3. Web medium 1 is shown fed into and through device 10. Web medium 1 is shown breaking at location 4 within dryer 3.

Figure 4:
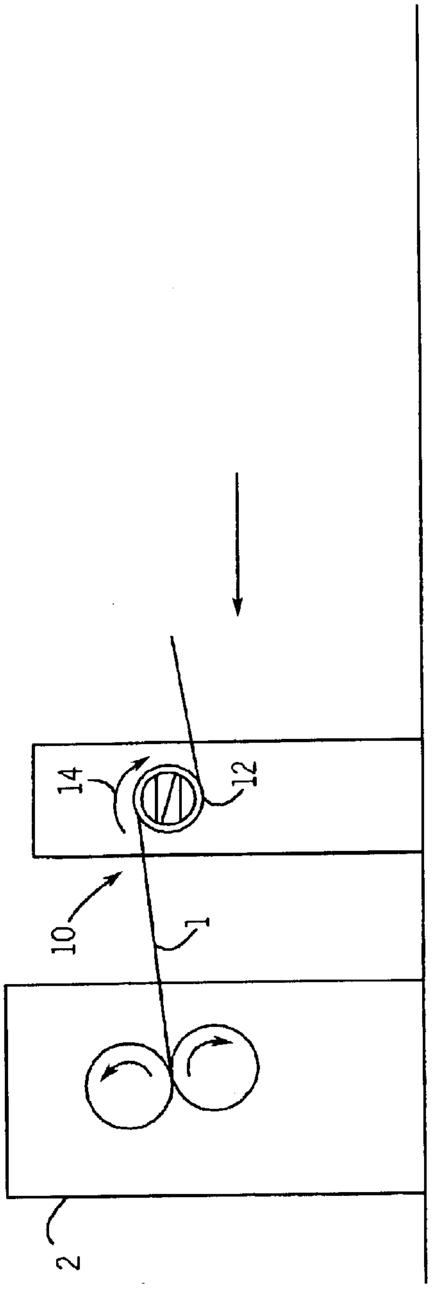
FIG. 4 is a schematic illustration showing the web press rotary equipment protection device engaged according to one aspect of the present invention.

Now turning to FIG. 4, a schematic illustration showing the web press rotary equipment protection device 10 in an engaged position is provided. Cylinder 12 of device 10 rotates in a direction indicated by arrow 14 to engage web medium 1 following a break, thereby tensioning medium 1 and removing them from the cylinders of rotary application 2, as well as from the drying unit of FIG. 3.

Figure 5:
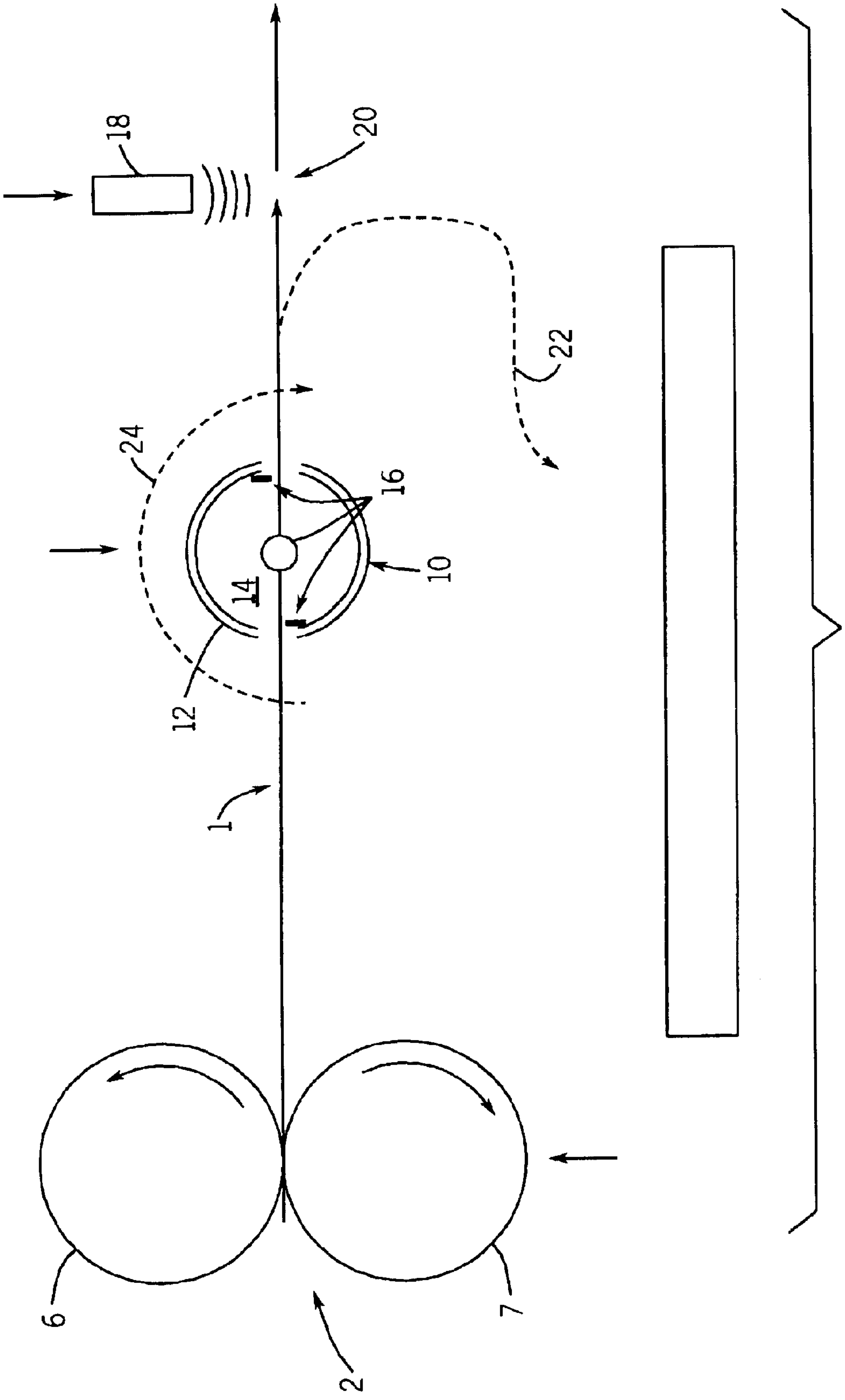
FIG. 5 is a schematic illustration of web press rotary equipment protection system according to one aspect of the present invention.

FIG. 5 is a schematic illustration of web press rotary equipment protection system according to one aspect of the present invention. The present invention may be provided as part of a new rotary press system, or alternatively, used as a retrofit to existing rotary press systems. Although the present invention is shown as used in a printing operation, it is contemplated that the present invention may be used in any industry in which protection of the rotary components is desired. These industries may include the web converting (paper making), textiles, plastics or other industries in which the rotary components used as part of printing, embossing, calendaring or extruding operations could become damaged as a result of a break in the material being used in the process Rotary process 2 generally includes rotating cylinders 6 and 7, rotating in opposite directions in a conventional manner to move a web medium 1 away from rotary cylinders 6 and 7. Web medium 1 may include any suitable medium, including paper, plastic or textiles. Web medium 1 travels through a roller or cylinder 12 having a web medium passage slot or opening 14 that permits the web medium 1 to pass through roller 12. During unbroken web operation, roller 12 does not rotate and utilizes toothed knife blades 16 located above and below the web medium 1 on opposite ends of roller 12 to provide support for, and if necessary cut in an emergency, web medium 1.

During operation, a detector or sensor 18 is used to monitor the continuity of web medium 1 and detect any breaks in the web medium Detector 18 may be supplied as part of a package with the roller 12, or may be an existing detector already present in the rotary system. Preferably, detector 18 is an ultrasonic sensor that uses ultrasound to detect breaks in the web medium 1. Upon the occurrence of a break in web medium 1, as indicated by 20, resulting in a break-off of the web medium, shown as dashed line 22, roller 12 rotates (in the embodiment shown in a clockwise fashion (arrow 24)) so as to wrap web medium 1 (broken web medium 22) around roller 12 and prevent the web medium from going back into the rotary process 2. End shaft portion 16, and its counterpart on the opposite end of roller 12, allow roller 12 to rotate without preventing web medium 1 from travelling backward through roller 12.

Figure 6:
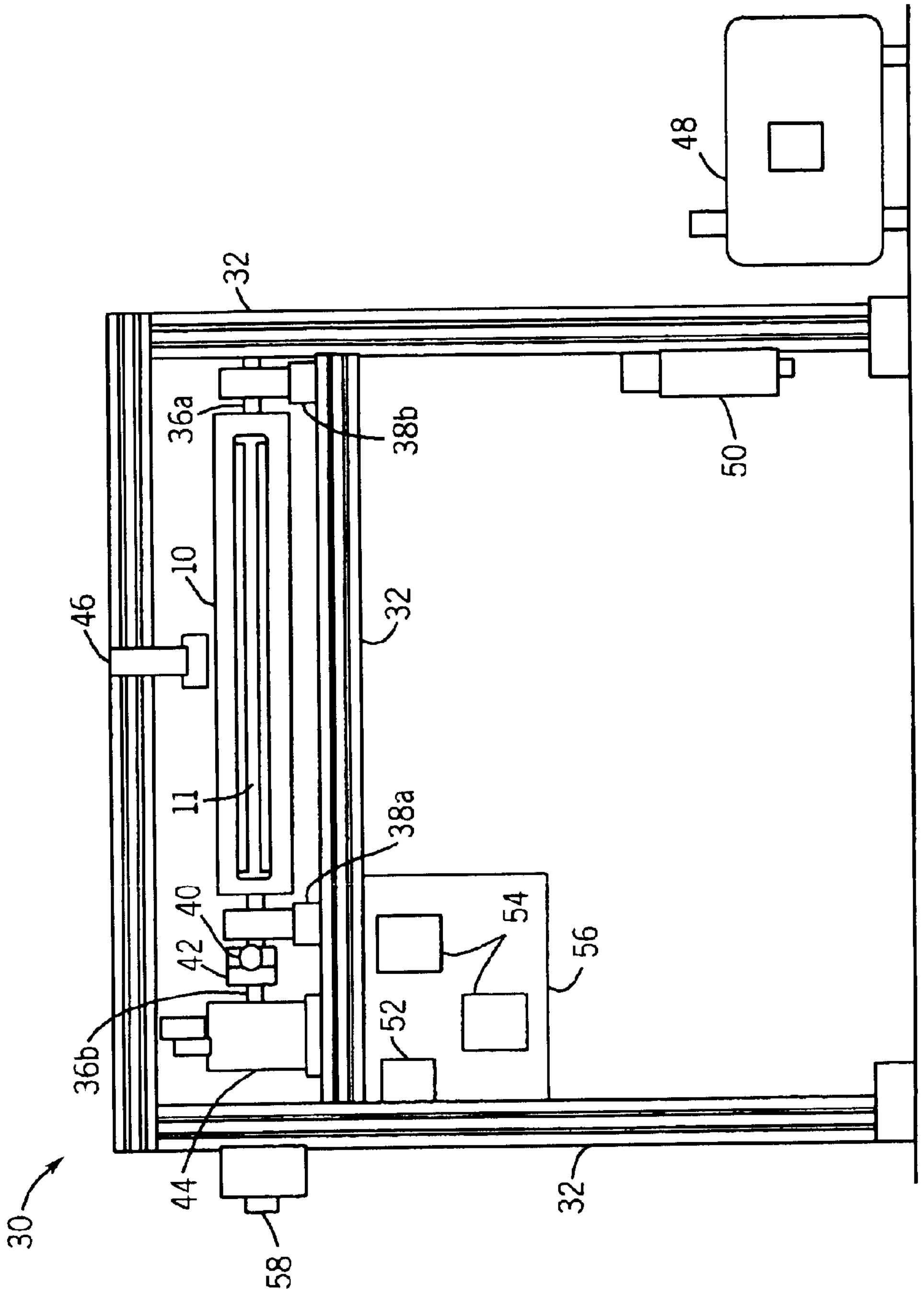
FIG. 6 is a front view of the web press rotary equipment protection device with pneumatic motor drive in accordance with one aspect of the present invention.
Figure 7:
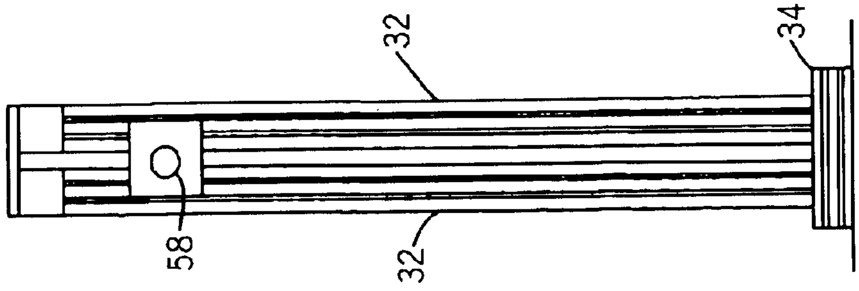
FIG. 7 is a side view of FIG. 6.

Referring to FIGS. 6–7, an embodiment of the physical apparatus 30 incorporating the web press rotary equipment protection device 10 (alternatively "roller" or "cylinder") is illustrated. In this embodiment, device 10 is driven by a pneumatic system when engaged. The roller 10 includes a frame 32 supported by a base 34. Preferably, frame 32 is constructed from modular extrusion material. Roller 10 is supported by a shaft portions **36*a*–*b* which engage clutch bearings 38*a*–*b*, which are secured to frame 32. Roller 10 is preferably aluminum and includes a web medium opening 11 (e.g., a milled slot) in order to accommodate passage of a web medium. Preferably, the medium passage slot is substantially transverse to a length of the roller. In general, the medium passage slot is located along a diameter of the roller such that the web medium may pass through a central axis of the roller along the diameter. Because the system is driven by pneumatics, a pneumatic solenoid 40 is used to index roller 10 to assure that web medium opening is level. In one aspect, the solenoid 40 can be of a single acting variety with spring return. Solenoid 40 is mounted to frame 30 and when its pneumatic piston is extended it comes in contact with an alignment hole located in coupler 42 which consists of two aluminum couplings connected by a flexible rubber insert for alignment of roller 10. Shaft portion 36*b* is driven by motor 44 which is preferably a pneumatic vane-type directional motor. Medium sensor 46 monitors for breakage of the medium as it passes through opening 11. Reserve air can be supplied to and controlled by air regulator 50 by ballast tank 48. In this embodiment, air is supplied to solenoids 52 and 54, which are preferably 115 VAC ⅛" and 115 VAC ½" for indexing solenoid and motor input, respectively. Solenoids 52 and 54 are both mounted to electrical enclosure 56, which contains all of the necessary electrical components, included, in a preferred embodiment, timing relays, interlock relays, transformers, emergency stop relays, fuse block assemblies, on-off switch, etc. Switch 58 is used to turn roller 10** on or off as desired. Use of the present invention with a pneumatic drive system is preferred for press speeds up to approximately 2000 feet per minute.

Figure 8:
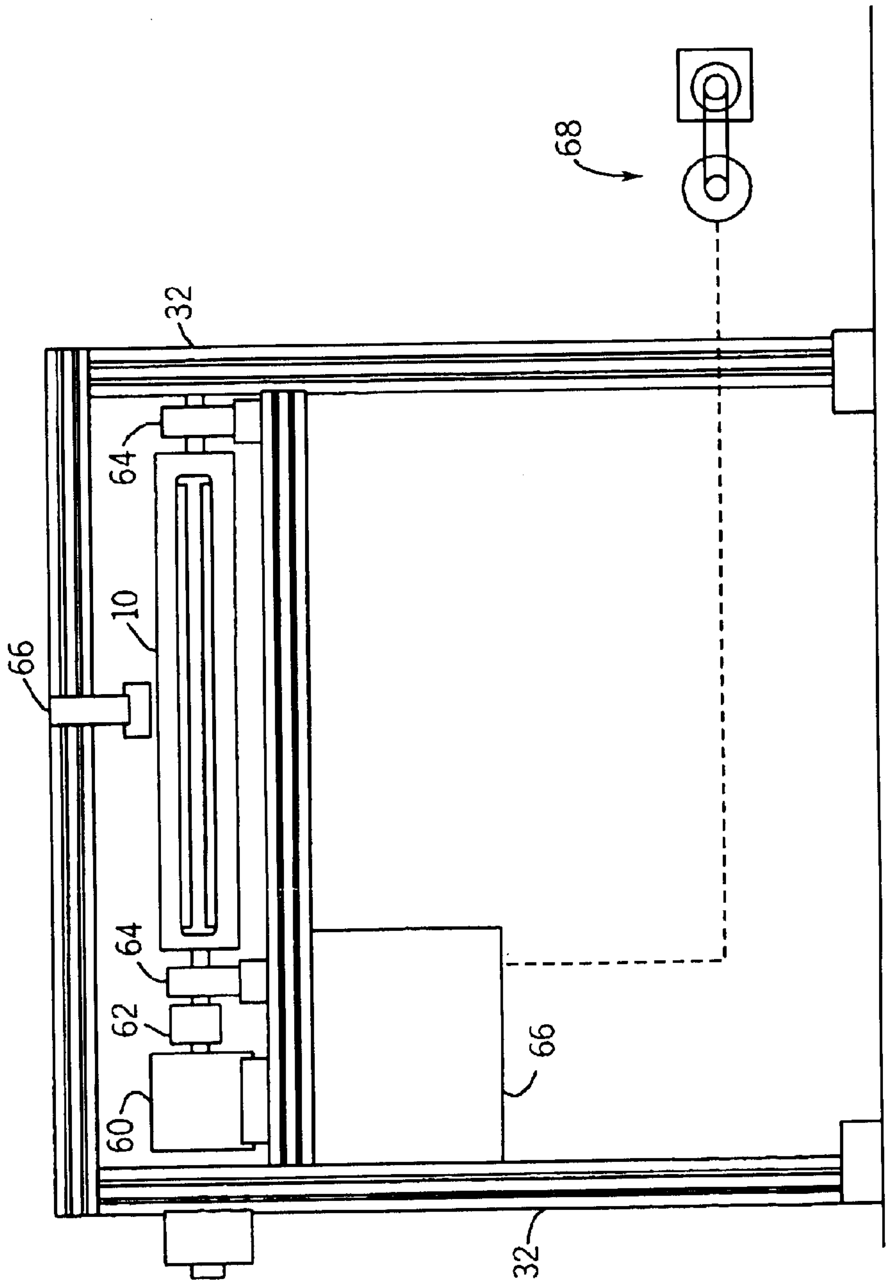
FIG. 8 a front view of the web press rotary equipment protection device with electric motor drive in accordance with one aspect of the present invention.
Figure 9:
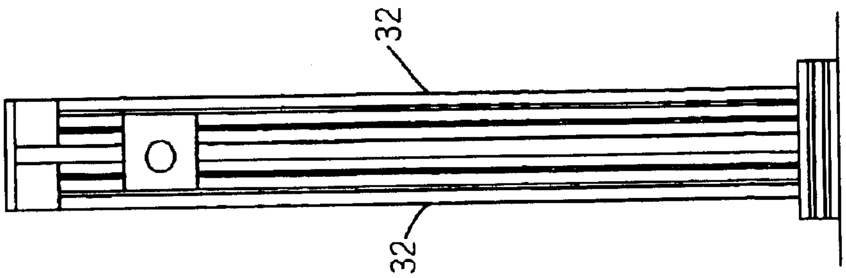
FIG. 9 is a side view of FIG. 8.

Turning to FIGS. 8–9, another embodiment of the present invention is shown. As shown, a similar frame 32 to that of FIGS. 6–7 is included. In this embodiment, roller 10 is driven by an electric motor 60. The motor 60 works with clutch 62 and clutch bearing 64 to drive roller 10, preferably in a single direction (i.e., lock up occurs when roller 10 is driven in the opposite direction so as to protect the web medium). Again, sensor 66 monitors the medium for breaks. Control for motor 60 can be accomplished using electrical interface box 66, which includes PLC and drive motor drive control components. In order to synchronize the press speed with the roller speed, a speed-following tachometer or encoder 68 is interfaced with box 66. Use of the present invention with an electric drive system is preferred for press speeds greater than approximately 2000 feet per minute.

Figure 10:
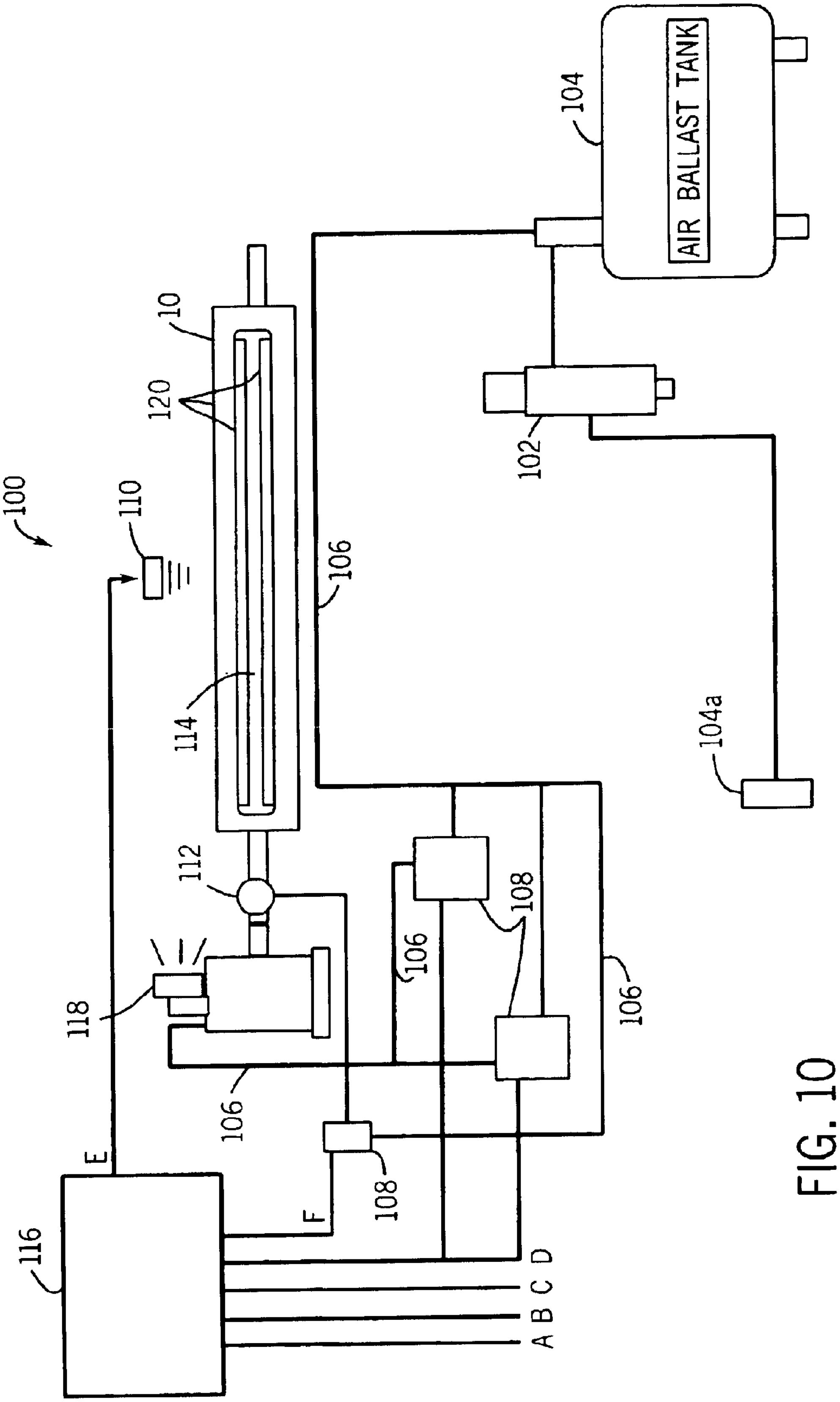
FIG. 10 is schematic overview of the press rotary equipment protection system with pneumatic motor drive in accordance with one aspect of the present invention.

FIG. 10 is an operational diagram of one embodiment of press rotary equipment protection system 100 with pneumatic motor drive in accordance with one aspect of the present invention. An electric motor driven version is also contemplated. The pneumatic version of the anti-wrap system works off of a principal of compressed pneumatic air. In operation, house air is brought into the anti-wrap systems by air regulator 102, preferably set at 100–120 PSI, from the resident air supply 104*a*. From the regulator the air is sent to air ballast tank 104. The ballast tank 104 supplies air in this embodiment when system 100 is activated (i.e., when it is desired to rotate roller 10). Air leaves the ballast tank 104 and is directed via tubing 106 (e.g., ½" ID plastic tubing) to the dual electro-pneumatic solenoids 108, which are used as the Main Motor Feed. It is important to note that air, while available, is not used to rotate the roller 10 until after a break in the web medium is detected. To that end, air pressure is blocked off at the entrance to the solenoids 108 until the ultrasonic or other sensor 110 detects a break in the web or other type of material. When system 100 is inactive (i.e., no web medium break detected), an indexing pin 112 is engaged which maintains medium opening 114 in a parallel position with respect to the web medium. Once the press reaches an arming speed of 15–20%, the indexing pin 112 is retracted and the system remains in a ready state.

If no breaks in the web (or other type of material) occur, the system 100 remains ready to be activated. When a break occurs, the high-speed ultrasonic sensor 110 receives a change in condition and sends a signal to the electrical interface box 116 where, in a preferred embodiment, two timing circuits (not shown) are triggered. In this case, the first timing circuit is for the pneumatic motor 118 and is used to engage the dual electro-pneumatic solenoids 108, which supply the air necessary for the motor to run. The first timer is set to run for approximately six seconds. Two solenoids are required due to the airflow requirements of the motor. Once the motor 118 is activated, the roller 10 will start to gain momentum, in this embodiment turning clockwise—as viewed from the operator side. Once the roller 10 contacts the loose web, the lead edge of the front and back slots which contain the two respective knife blades 120 puncture the web and hold it as the web is wrapped around the cylinder. The roller 10 then increases speed until it attains a speed corresponding to the speed at which the press is running (same surface speed) at which time the roller surface speed will be limited by the speed of the press as the press starts to slow down. In this way, medium exiting the rotary printing unit can act as a breaking mechanism which in turn can serve to restrain the pneumatic motor 118 via the taught or tightened paper. This results in the roller surface speed being equal or substantially equal to the press speed.

The second timer can also be simultaneously activated to keep the indexing pin 112 in a retracted position until the motor 118 and roller 10 come to a complete stop. In a preferred embodiment, this timer can be set for approximately a fifteen second delay. After each timer reaches its time-out the respective timer resets itself and the system is ready to be reset. In order to remove the paper that is wrapped up around the roller, such as with a knife, the operator turns the power to the system off. Once the web medium is removed, the roller 10 can be turned by hand until the indexing pin 112 contacts the indexing stud located on the drive coupler. Electrical connections electrical interface box 116 include: A) 115 VAC Power, B) 15–20% Press Speed Interlock, C) Optional Emergency Stop Input From Press, D) Output to Main Electro-Pneumatic Solenoids, E) Electrical Connection to Ultrasonic Sensor, and F) Connection to Indexing Electro-Pneumatic Solenoid.

Another version of the system employs the use of an electronic servo drive motor, which takes the place of the pneumatic system entirely. The electronic servo drive option is for higher speed applications and the drive motor runs at 30% higher speed than the press for the first four revolutions and then matches press speed exactly by using a reference encoder.

A method of protecting a rotary web press is also disclosed. The method comprises: providing a roller having a web medium passage slot for receiving a web medium therethrough from the rotary web press; and passing the web medium through the web medium passage slot of the roller. The addition, the method can further include: detecting a break in the web medium; rotating the roller in response to detecting the break; engaging the medium passing through the medium passage slot of the roller; and wrapping the web medium around the roller.

The present invention has been described in terms of the preferred embodiment, and it is recognized that equivalents, alternatives, and modifications, aside from those expressly stated, are possible and within the scope of the appending claims.

What is claimed is:

1. A web press rotary equipment protection device for use with a rotary system and a web medium comprising:

a roller having a web medium passages slot, the roller capable of receiving the web medium through the medium passage slot;

wherein the roller is connected to a plurality of knives capable of severing the web medium; and wherein upon a break in the web medium, the roller rotates and engages the web medium in the medium passage slot such that the web medium wraps around the roller, thereby preventing the web medium from being pulled back into the rotary system.

2. A method of protecting a rotary web press comprising:

providing a roller having a web medium passage slot for receiving a web medium therethrough from the rotary web press; and passing the web medium through the web medium passage slot of the roller;

detecting a break in the web medium;

rotating the roller in response to detecting the break;

engaging the medium passing through the medium passage slot of the roller; and wrapping the web medium around the roller.

3. The method of claim 2, wherein the wrapping of the web medium around the roller draws the web media from a rotary process preceding the roller.

4. The method of claim 3 wherein the rotary process is a web printing process.

5. The method of claim 2, wherein the wrapping of the web medium around the roller draws the web media from a device following the roller.

6. The method of claim 5, wherein the device acts dually as a rotary equipment protection system during normal operation and as a web severing device as a back up system.

7. A web press rotary equipment protection system for use with a rotary system having a web medium comprising:

an equipment protection roller having an web medium opening, the web medium opening sized to permit the web medium to pass from the rotary system through the web medium opening in the equipment protection roller; and a web break detection sensor positioned to detect a break in the web medium;

wherein upon a break in the web medium, the roller rotates and engages the web medium in the medium passage slot such that the web medium wraps around the roller, thereby preventing the web medium from being pulled back into the rotary system

8. The system of claim 7, wherein the web break detection sensor is an ultrasonic sensor.

9. The system of claim 7, further including a motor to provide power to rotate the equipment protection roller upon the detection of a break in the web medium.

10. The system of claim 9, wherein the motor is a pneumatic motor that is started substantially upon the detection of a break in the web medium.

11. The system of claim 9, wherein the motor is an electric servo drive motor having a motor shaft that transfers power from the motor shaft to a clutch that engages the equipment protection roller upon the detection of a break in the web medium.

12. The system of claim further 7 including a plurality of knife blades positioned within the web medium opening and connected to the equipment protection roller to grip the web medium passing through the web medium opening of the equipment protection roller.

13. The system of claim 7 wherein the web medium opening is located along a diameter of the web protection roller such that the web medium may pass through a central axis of the web protection roller along the diameter.

14. The system of claim 7 wherein the web protection roller remains substantially stationary until the detection of a break in the web medium.

* * * * *